(12) United States Patent
Katz et al.

(10) Patent No.: US 12,355,554 B1
(45) Date of Patent: Jul. 8, 2025

(54) METHOD AND APPARATUS FOR PASSING CLOCK SIGNALS BETWEEN TIME DOMAINS

(71) Applicant: Marvell Asia Pte Ltd, Singapore (SG)

(72) Inventors: Adi Katz, Ramat Gan (IL); Moran Noiman, Kiryat Ono (IL); Yaakov Yehezkel, Rehovot (IL); Eliya Babitsky, Caesaria (IL)

(73) Assignee: Marvell Asia Pte Ltd, Singapore (SG)

( * ) Notice: Subject to any disclaimer, the term of this patent is extended or adjusted under 35 U.S.C. 154(b) by 595 days.

(21) Appl. No.: 17/807,424

(22) Filed: Jun. 17, 2022

Related U.S. Application Data

(60) Provisional application No. 63/212,488, filed on Jun. 18, 2021.

(51) Int. Cl.
*H04J 3/06* (2006.01)
*H04J 3/16* (2006.01)

(52) U.S. Cl.
CPC .......... *H04J 3/0661* (2013.01); *H04J 3/0626* (2013.01); *H04J 3/0682* (2013.01); *H04J 3/1676* (2013.01)

(58) Field of Classification Search
None
See application file for complete search history.

(56) References Cited

U.S. PATENT DOCUMENTS

| | | | | |
|---|---|---|---|---|
| 5,914,962 | A | * | 6/1999 | Fimoff .............. H04N 21/23611 375/E7.269 |
| 2014/0153591 | A1 | * | 6/2014 | Bedrosian ............. H04J 3/0658 370/517 |
| 2017/0147725 | A1 | * | 5/2017 | Larzul ..................... G06F 30/34 |
| 2018/0343183 | A1 | * | 11/2018 | Pope .................. G06F 13/1689 |
| 2019/0386763 | A1 | * | 12/2019 | Rentschler ............ H04L 43/106 |
| 2021/0313993 | A1 | * | 10/2021 | Bai ......................... H04L 7/005 |

\* cited by examiner

*Primary Examiner* — Gregory B Sefcheck
*Assistant Examiner* — Majid Esmaeilian

(57) ABSTRACT

A method of reducing jitter in transmission of a timestamp across a clock domain boundary includes storing N timestamps, generated in N successive clock cycles of an origin clock domain, in N parallel buffers in the origin clock domain under control of a modulo-N counter, transmitting outputs of the N parallel buffers across the clock domain boundary into a destination clock domain along with the modulo-N counter, processing the modulo-N counter in the destination clock domain to derive a selection signal that selects a stable timestamp from among the outputs of the N parallel buffers, and outputting the selected stable timestamp. The modulo-N counter may be Gray-coded modulo-N counter to reduce jitter in the modulo-N counter across the clock domain boundary.

24 Claims, 5 Drawing Sheets

METHOD AND APPARATUS FOR PASSING CLOCK SIGNALS BETWEEN TIME DOMAINS

CROSS REFERENCE TO RELATED APPLICATION

This disclosure claims the benefit of commonly-assigned U.S. Provisional Patent Application No. 63/212,488, filed Jun. 18, 2021, which is hereby incorporated by reference herein in its entirety.

FIELD OF USE

This disclosure relates to synchronization of timestamp signals across clock domain boundaries. More particularly, this disclosure relates to the transmission of timestamp signals across clock domain boundaries with reduced jitter, or without jitter.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the subject matter of the present disclosure.

Ethernet devices operate under a clock protocol known as Precision Time Protocol (PTP) according to which each device, or node, maintains its own time-of-day clock, but periodically corrects its time-of-day clock by querying a master node, which is known to have the correct time of day, and may be referred to as a "grandmaster" node, or other network timebase. A "slave" (i.e., non-master) node may send a time query message to the network timebase, which may reply by returning a timestamp signal to the slave node. However, in some cases, the slave node may be located in a portion of the network that is clocked by a different clock—i.e., is in a different time domain—than the portion of the network in which the network timebase is located, adding jitter to the timestamp signal as it crosses the clock domain boundary. Similarly, even within a single node with a connection to the network time, there may be a portion clocked by a slave clock with its own time source, resulting in jitter as a timestamp crosses from the network clock domain within the node to the slave clock domain within the node.

SUMMARY

In accordance with implementations of the subject matter of this disclosure, a method of reducing jitter in transmission of a timestamp across a clock domain boundary includes storing N timestamps, generated in N successive clock cycles of an origin clock domain, in N parallel buffers in the origin clock domain under control of a modulo-N counter, transmitting outputs of the N parallel buffers across the clock domain boundary into a destination clock domain along with the modulo-N counter, processing the modulo-N counter in the destination clock domain to derive a selection signal that selects a stable timestamp from among the outputs of the N parallel buffers, and outputting the selected stable timestamp.

In a first implementation of such a method, storing the N timestamps under control of the modulo-N counter may include storing the N timestamps under control of a Gray-coded modulo-N counter to reduce jitter in the modulo-N counter across the clock domain boundary.

In a second implementation of such a method, processing the modulo-N counter to derive the selection signal may include applying an offset to the modulo-N counter.

According to a first aspect of that second implementation, applying an offset to the modulo-N counter may include applying an offset that accounts for both uncertainty in the modulo-N counter and instability in the N timestamps.

According to a second aspect of that second implementation, N may equal 4 and the offset may equal 2.

A third aspect of that second implementation may further include processing the selected timestamp to account for temporal shifting caused by the offset.

A fourth aspect of that second implementation may further include processing the selected timestamp to account for additional temporal shifting caused during the selection of the stable timestamp.

In a third implementation of such a method, transmitting the outputs of the N parallel buffers across the clock domain boundary may include delaying the outputs of the N parallel buffers.

A first aspect of that third implementation may further include processing the selected timestamp to account for temporal shifting caused by the delaying.

A first instance of that first aspect of the third implementation may further include processing the selected timestamp to account for temporal shifting caused by selecting from among the outputs of the N parallel buffers.

In accordance with implementations of the subject matter of this disclosure, timestamp synchronization circuitry for reducing jitter in transmission of a timestamp across a clock domain boundary includes N parallel buffers in an origin clock domain, the N parallel buffers being configured to store N timestamps generated in N successive clock cycles in the origin clock domain, a modulo-N counter configured to generate a selection signal to indicate in which of the N parallel buffers a current timestamp is stored, and timestamp selection circuitry in a destination clock domain across the clock domain boundary, the timestamp selection circuitry being configured to process the modulo-N counter in the destination clock domain to derive a selection signal that selects a stable timestamp from among the outputs of the N parallel buffers and to output the selected stable timestamp.

In a first implementation of such timestamp synchronization circuitry, the modulo-N counter may be Gray-coded.

In a second implementation of such timestamp synchronization circuitry, the timestamp selection circuitry may be configured to process output of the modulo-N counter to derive the selection signal by applying an offset to the output of the modulo-N counter.

According to a first aspect of that second implementation, the timestamp selection circuitry may be configured to process the modulo-N counter to derive the selection signal by applying to the modulo-N counter an offset that accounts for both uncertainty in the modulo-N counter and instability in the N timestamps.

According to a second aspect of that second implementation, N may equal 4 and the offset may equal 2.

According to a third aspect of that second implementation, the timestamp selection circuitry may further be configured to process the selected timestamp to account for temporal shifting caused by the offset.

According to a fourth aspect of that second implementation, the timestamp selection circuitry may further be configured to process the selected timestamp to account for additional temporal shifting caused during the selection of the stable timestamp.

A third implementation of such timestamp synchronization circuitry may further include delay circuitry configured to delay the outputs of the N parallel buffers when transmitting the outputs of the N parallel buffers across the clock domain boundary.

According to a first aspect of that third implementation, the timestamp selection circuitry may further be configured to process the selected timestamp to account for temporal shifting caused by the delay circuitry.

In a first instance of that first aspect of the third implementation, the timestamp selection circuitry may further be configured to process the selected timestamp to account for temporal shifting caused by selecting from among the outputs of the N parallel buffers.

In accordance with implementations of the subject matter of this disclosure, timestamp synchronization circuitry for reducing jitter in transmission of a timestamp across a clock domain boundary includes N parallel buffer means in an origin clock domain, the N parallel buffer means being configured to store N timestamps generated in N successive clock cycles in the origin clock domain, modulo-N counter means configured to generate a selection signal to indicate in which of the N parallel buffer means a current timestamp is stored, and timestamp selection means in a destination clock domain across the clock domain boundary, the timestamp selection means being configured to process the modulo-N counter in the destination clock domain to derive a selection signal that selects a stable timestamp from among the outputs of the N parallel buffer means and to output the selected stable timestamp.

In a first implementation of such timestamp synchronization circuitry, the modulo-N counter means may be Gray-coded.

In a second implementation of such timestamp synchronization circuitry, the timestamp selection means may be configured to process output of the modulo-N counter means to derive the selection signal by applying an offset to the output of the modulo-N counter means.

According to a first aspect of that second implementation, the timestamp selection means may be configured to process the output of the modulo-N counter means to derive the selection signal by applying to the output of the modulo-N counter means an offset that accounts for both uncertainty in the modulo-N counter means and instability in the N timestamps.

According to a second aspect of that second implementation, N may equal 4 and the offset may equal 2.

According to a third aspect of that first implementation, the timestamp selection means may further be configured to process the selected timestamp to account for temporal shifting caused by the offset.

According to a fourth aspect of that second implementation, the timestamp selection means may further be configured to process the selected timestamp to account for additional temporal shifting caused during the selection of the stable timestamp.

A third implementation of such timestamp synchronization circuitry may further include delay means configured to delay the outputs of the N parallel buffer means when transmitting the outputs of the N parallel buffer means across the clock domain boundary.

According to a first aspect of that third implementation, the timestamp selection means may further be configured to process the selected timestamp to account for temporal shifting caused by the delay means.

In a first instance of that first aspect of the third implementation, the timestamp selection means may further be configured to process the selected timestamp to account for temporal shifting caused by selecting from among the outputs of the N parallel buffer means.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

Figure 1:
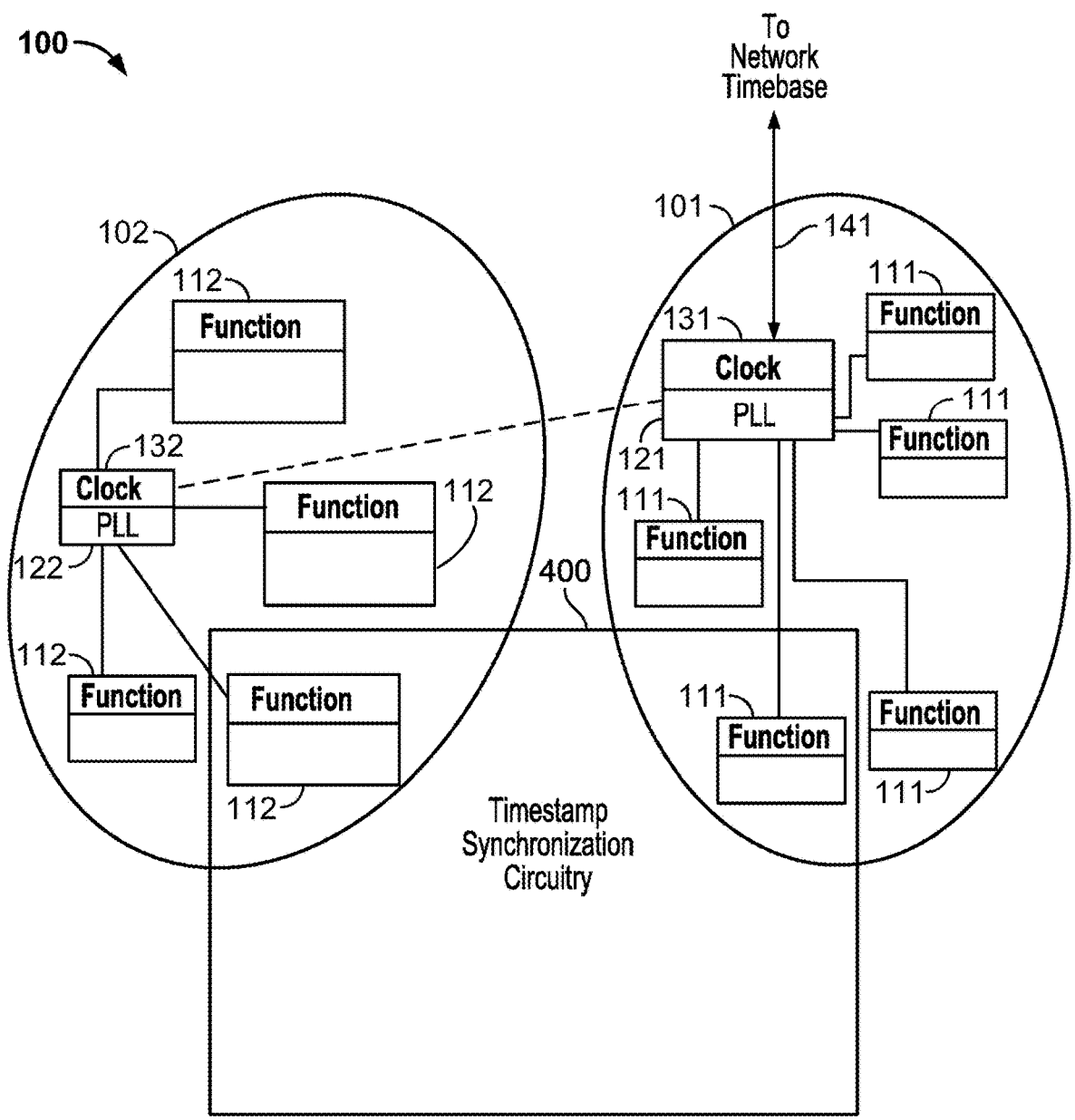
FIG. 1 is a high-level diagram of a network node incorporating the subject matter of this disclosure.

As noted above, Ethernet devices operate under a clock protocol governed by the IEEE 1588 standard and known as Precision Time Protocol (PTP), according to which each device, or node, maintains its own time-of-day clock, but periodically corrects its time-of-day clock by querying a master node, which is known to have the correct time of day, and may be referred to as a "grandmaster" node, or other network timebase. A "slave" (i.e., non-master) node may send a time query message to the network timebase, which may reply by returning a timestamp signal to the slave node. However, in some cases, the slave node may be located in a portion of the network that is clocked by a different clock—i.e., is in a different time domain—than the portion of the network in which the network timebase is located, adding jitter to the timestamp signal as it crosses the clock domain boundary. Similarly, even within a single node with a connection to the network time, there may be a portion clocked by a slave clock with its own time source, resulting in jitter as a timestamp crosses from the network clock domain within the node to the slave clock domain within the node.

Jitter arises because the clocks of the two domains are asynchronous, and therefore sampling of timestamp values may occur at a time when the timestamp is in the process of changing, and its bits are not stable.

Therefore, in accordance with implementations of the subject matter of this disclosure, the timestamp may be sampled on every clock of the origin time domain (i.e., the time domain in which the timestamp originates) and the N most recent timestamps (i.e., the current timestamp and the N−1 previous timestamps) may be saved in parallel buffers. A modulo-N counter, which counts up from 0 to N−1 before returning to 0 and starting over, serves as a pointer to control storage of the sampled timestamp in the correct buffer (e.g., by serving as a selection index of a demultiplexer).

The buffered timestamps, as well as the pointer value, are delivered to the destination domain, where the pointer value is used to determine which of the buffered timestamps to use. In some implementations of the subject matter of this disclosure, the buffered timestamp values are input to a multiplexer, and the pointer value is used to derive the selection control input for the multiplexer.

If the destination domain were to select the buffered timestamp indicated by the current pointer value, the buffered timestamp may or may not have had a stable value when stored. Moreover, the pointer value itself may not be stable. Therefore, in accordance with implementations of the subject matter of this disclosure, the pointer is backed off a predetermined number of positions to find a stable buffered timestamp value.

It can be demonstrated that if a particular buffered timestamp value is unstable, then the adjacent buffered timestamp values are stable. Therefore, the predetermined number of positions would be expected to be 1. However, the pointer value also is subject to jitter as it crosses the clock domain boundary, and therefore the pointer value itself is uncertain. If the pointer value is wrong, then backing off by 1 may inadvertently move from a stable timestamp value to an unstable timestamp value. Accordingly, in implementations of the subject matter of this disclosure, the selection of the timestamp value is based on the number of buffered timestamp values, and on the degree of uncertainty in the value of the pointer itself.

According to implementations of the subject matter of this disclosure, when the pointer value itself is unstable, the number of timestamp samples to back off of is the sum of the uncertainty in the pointer value and the uncertainty in the sample values, which in turn depends on the number of sample values.

In implementations of the subject matter of this disclosure, the pointer value may be Gray-coded. Because Gray-coded values change by only one bit at a time, if the pointer is Gray-coded and is sampled at a time when the values of the bits of the pointer value are not stable, then at most one bit would be wrong. Therefore the sampled pointer value would be either correct or off by 1.

In the illustrated implementations of the subject matter of this disclosure, the number of buffered timestamp samples is N=4. In a case where N=4, two buffered timestamp values is always an insufficient number to be certain of having at least one stable value, while three buffered timestamp values may or may not be sufficient. It can be shown empirically (see below) that four buffered timestamp values is a sufficient number, and while five or more buffered timestamp values therefore are more than sufficient, using more than four buffered timestamp values when four buffered timestamp values is sufficient merely wastes resources. It can further be shown that with four buffered timestamp values, backing off by one will select a stable buffered timestamp value.

Therefore, in accordance with implementations of the subject matter of this disclosure, using four buffered timestamp values and a Gray-coded pointer, an uncertainty of 1 is contributed by the number of buffered timestamp values, and a further uncertainty of 1 is contributed by the pointer value, so backing off by 2 from the pointer value is expected to yield a stable buffered timestamp value. Although that results in using a timestamp that is two samples old (not including any delay in propagation of the timestamp or the pointer value itself), the goal is to reduce or eliminate jitter, and any fixed difference, because of using older samples as well as any other fixed delay in the logic path, can be accounted for.

The subject matter of this disclosure may be better understood by reference to FIGS. 1-5.

FIG. 1 is a high-level diagram of a network node 100 incorporating the subject matter of this disclosure. Network environment 100 may include a first time domain 101, including a plurality of functional circuits 111, which are clocked by a local clock source 131 which may, e.g., include a phase-locked loop (PLL) circuit 121. Network node 100 also may include a second time domain 102, including a plurality of functional circuits 112, which are clocked by a local clock source 132 which also may include a PLL circuit 122. PLL circuit 121 and PLL circuit 122 may not be synchronous with one another.

The time of day in network node 100 may be determined in accordance with the aforementioned Precision Time Protocol under the IEEE 1588 standard. As noted above, each device in a network, including node 100, may maintain its own time-of-day clock, but may periodically correct its time-of-day clock by querying a network timebase (not shown) via a connection 141.

If local clock source 131 in time domain 101 of node 100 needs to know the time of day, clock source 131 can make a time-of-day request to the network timebase. Clock source 132 in time domain 102 of node 100 can be synchronized by a "timestamp" in accordance with the IEEE 1588 standard from clock source 131. However, transmission of the timestamp from clock source 131 to clock source 132 includes crossing from the clock domain of PLL 121 to the clock domain of PLL 122, potentially giving rise to jitter in the timestamp.

Figure 2:
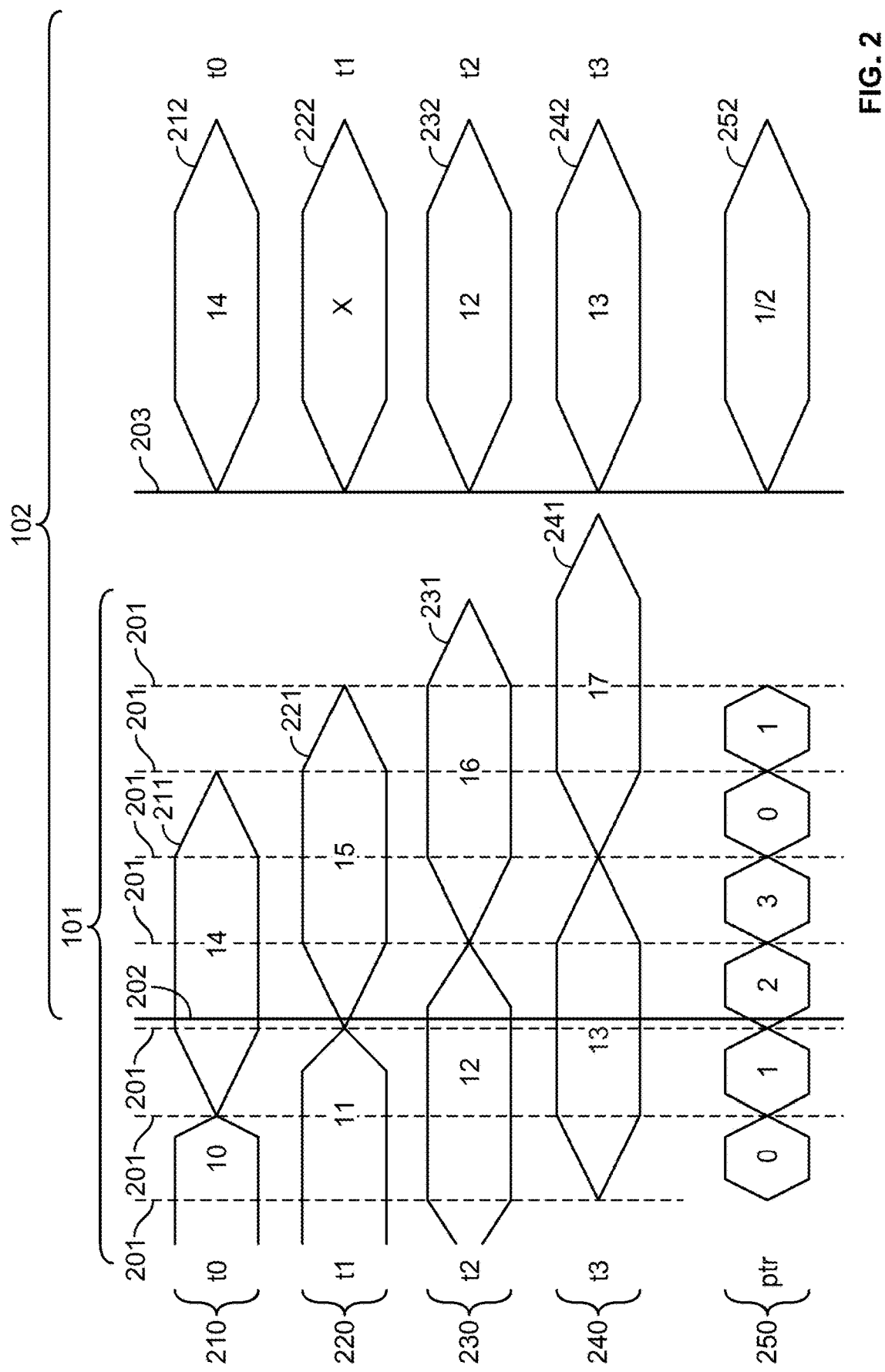
FIG. 2 illustrates the transmission of a timestamp from an origin clock domain with a faster clock rate to a destination clock domain with a slower clock rate.
Figure 3:
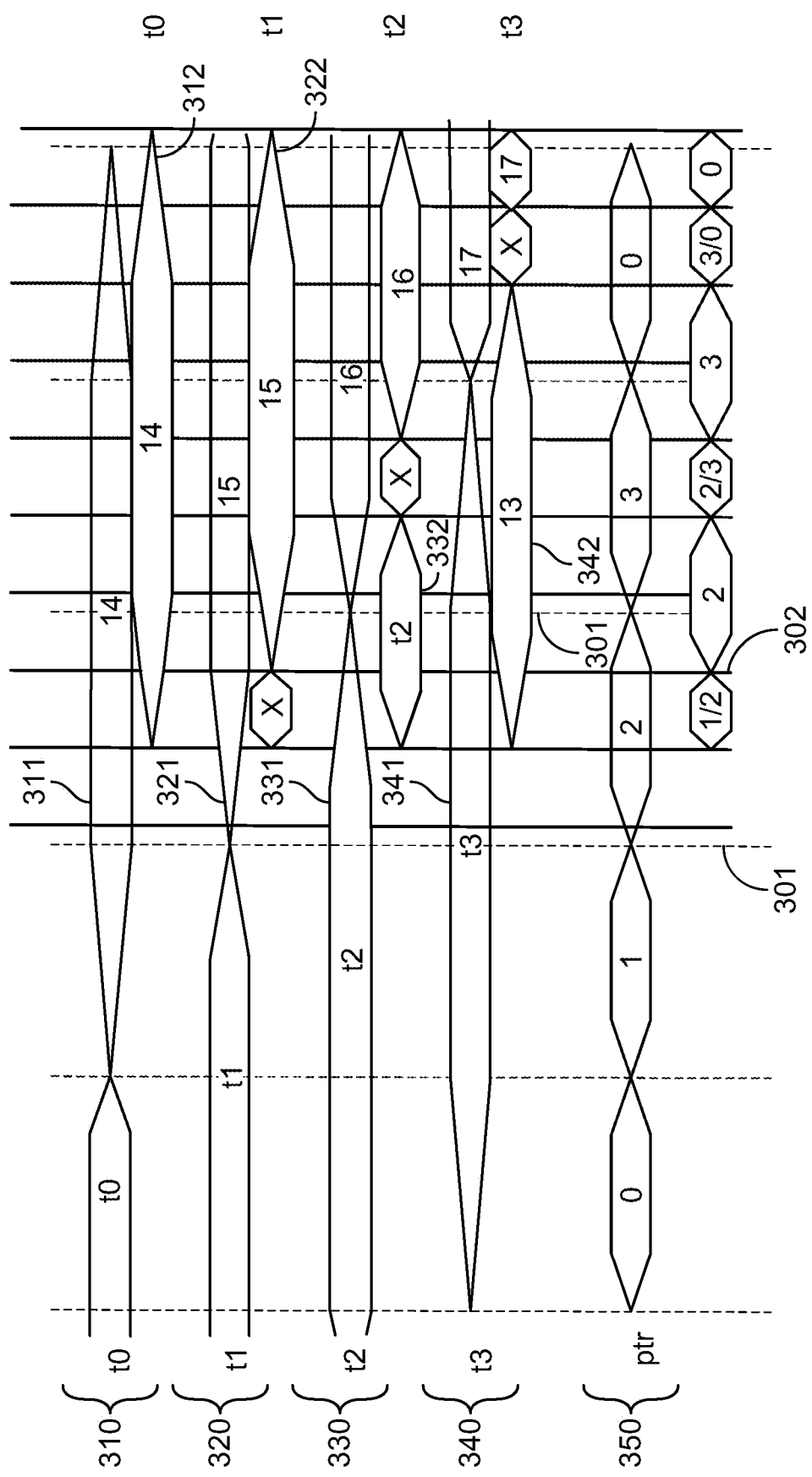
FIG. 3 illustrates the transmission of a timestamp from an origin clock domain with a slower clock rate to a destination clock domain with a faster clock rate.

The source of the potential jitter may be understood from FIGS. 2 and 3. FIG. 2 shows the transmission of a timestamp from an origin clock domain 101 with a faster clock rate to a destination clock domain 102 with a slower clock rate, while FIG. 3 shows the transmission of a timestamp from an origin clock domain 101 with a slower clock rate to a destination clock domain 102 with a faster clock rate.

As seen in FIG. 2, the rising edges of the clock in the origin clock domain 101 are represented by dashed lines 201, while the rising edges of the clock in the destination clock domain 102 are represented by solid lines 202, 203. Dashed lines 201 are closer together than solid lines 202, signifying that the clock in the origin clock domain 101 is faster than the clock in the destination clock domain 102.

Rows 210-240 represent four different timestamp sampling streams whose values change on different rising edges 201 of the clock in the origin clock domain 101. Row 250 represents a modulo-4 counter/pointer that cyclically counts from 0 to 3, representing which one of the rows 210-240 that, in the origin clock domain, will be sampled on the next rising edge 201. When counter/pointer 250 is received in destination clock domain 102, counter/pointer 250 is sampled on a rising edge 202 of the clock of destination clock domain 102, which determines which of samples 210-240 is used in clock domain 102 as the current timestamp at clock edge 203.

As can be seen in FIG. 2, for the timestamps 210-240 sampled on the clock edge 202 at which the value of counter/pointer 250 is '1', samples 211, 231, 241 of timestamp 210, 230, 240 are stable, leading to stable timestamp values 212, 232, 242 at clock edge 203 in clock domain 102, while sample 221 of timestamp 220 is in the process of changing from one value to another and is therefore unstable, leading to an invalid timestamp value 222. Thus, use of that timestamp sample 221 as the current timestamp would increase jitter in the timestamp.

Moreover, at clock edge 202, counter/pointer 250 itself is unstable. However, because counter/pointer 250 is Gray-coded, the uncertainty is only ±1, meaning the value, in this illustration, of counter/pointer sample 252 is either '1' or '2', pointing to timestamp sample 221, which is invalid, or timestamp sample 231, which is valid.

As can be seen, if the timestamp values 210-240 were instead sampled at that one of clock edges 201 following clock edge 202, there would still be three valid samples and one invalid sample (in this case the invalid sample would be sample 231).

Returning to the illustration in FIG. 2, it can be seen empirically that regardless of which of the two possible values of counter/pointer sample 252 is used, subtracting '2' yields a stable timestamp value. That is, if counter/pointer sample 252 is '1', subtracting '2' (modulo-4) yields '3', pointing to stable sample 241, while if counter/pointer sample 252 is '2', subtracting '2' (modulo-4) yields '0', pointing to stable sample 211.

The same relationships can be seen in FIG. 3, which illustrate the situation where the clock rate in origin clock domain 101 is slower than the clock rate in destination clock domain 102.

As can be seen in FIG. 3, for the timestamps 310-340 sampled on the clock edge 301 at which the value of counter/pointer 350 is '1', samples 311, 331, 341 of timestamp 310, 330, 340 are stable, leading to stable timestamp values 312, 332, 342 at clock edge 302 in clock domain 102, while sample 321 of timestamp 320 is in the process of changing from one value to another and is therefore unstable, leading to an invalid timestamp value 322. Thus, use of that timestamp sample 321 as the current timestamp would increase jitter in the timestamp.

Moreover, at clock edge 302, counter/pointer 350 itself is unstable. Because it is Gray-coded, the uncertainty is only ±1, meaning the value, in this illustration, of counter/pointer 350 is either '1' or '2', pointing to timestamp sample 321, which is valid, or timestamp sample 331, which is invalid.

As can be seen, if the timestamp values 310-340 were instead sampled at that one of clock edges 301 following clock edge 302, there would still be three valid samples and one invalid sample (in this case the invalid sample would be sample 331). This assumes that, as in the illustration, the duration of each timestamp sample is a number of clock periods equal to the number of cycles N of counter/pointer 350.

Returning to the illustration in FIG. 3, it can be seen empirically that regardless of which of the two possible values of counter/pointer 350 is used, subtracting '2' yields a stable timestamp value. That is, if counter/pointer 350 is '1', subtracting '2' (modulo-4) yields '3', pointing to stable sample 341, while if counter/pointer 350 is '2', subtracting '2' (modulo-4) yields '0', pointing to stable sample 311.

If counter/pointer 350 were binary, rather than Gray-coded, the uncertainty if counter/pointer 350 were sampled during a transition may be greater than '1' because more than one bit might be changing. Therefore, a higher value of N, and/or a different subtraction value than '2', may be required.

Figure 4:
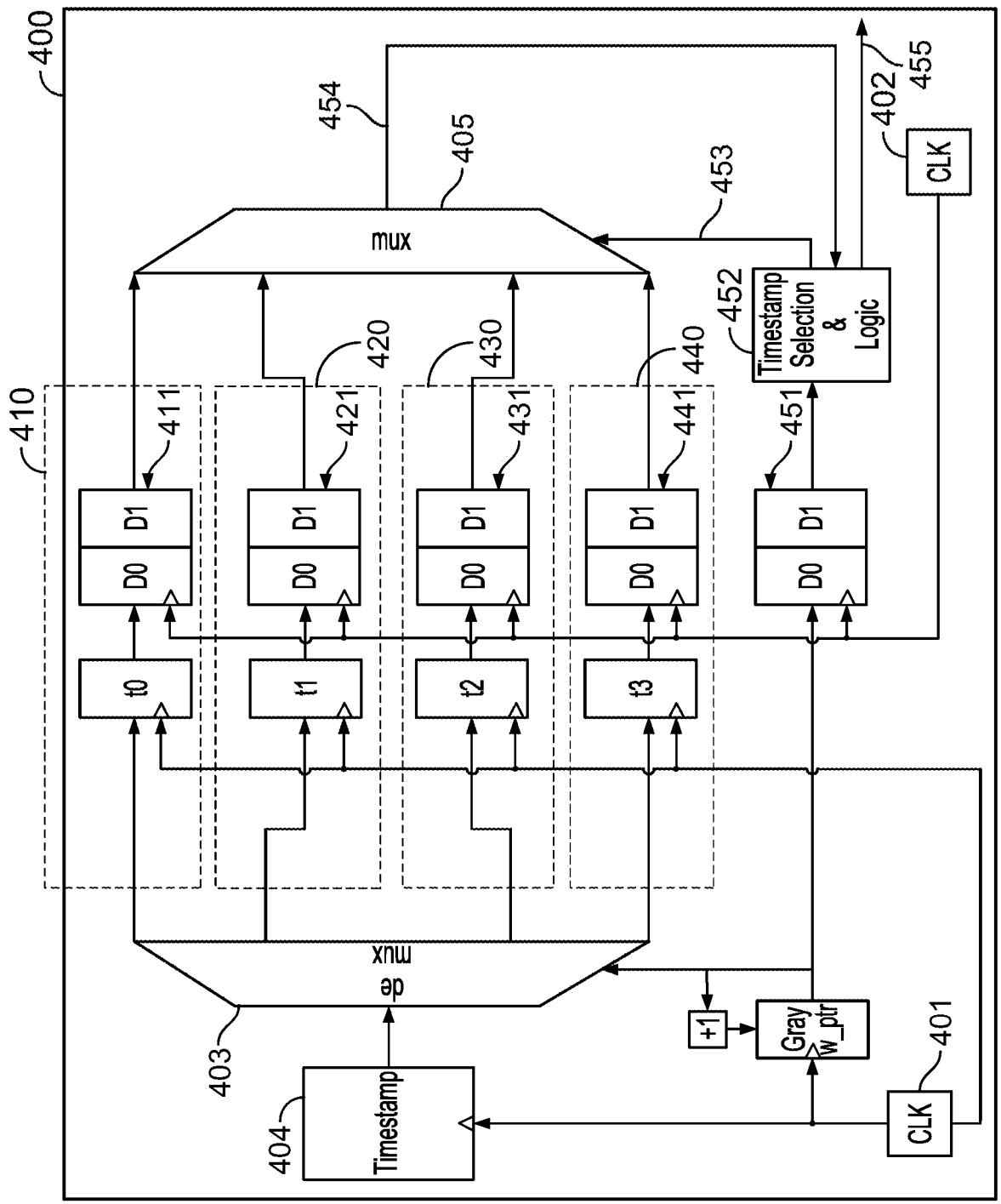
FIG. 4 is a diagram of timestamp synchronization circuitry in accordance with implementations of the subject matter of this disclosure.

Therefore, in accordance with implementations of the subject matter of this disclosure, network 100 includes timestamp synchronization circuitry 400, which is illustrated in FIG. 4 and may be considered to "straddle" the two time domains 101, 102.

At each cycle of clock 401 of clock domain 101, a timestamp is sampled from local clock source 131. Counter/pointer 250, which may be Gray-coded as described above, controls demultiplexer 403 to select one of buffer lines 410, 420, 430, 440 in round-robin fashion for the storage of the current timestamp, generated at 404. Thus, in this implementation, at any time the four most recent timestamps are stored.

The samples in buffer lines 410, 420, 430, 440 are clocked through respective register pairs 411, 421, 431, 441 (each of which may be a pair of D-type flip-flops), which are clocked by clock 402 of clock domain 102, to give the sampled data time to settle. To maintain temporal alignment, the output of counter/pointer 250 also is clocked through a register pair 451 before being input to timestamp selection logic 452, which derives from the output of counter/pointer 250 a selection value 453 that is input to multiplexer 405 to select one of the samples in buffer lines 410, 420, 430, 440 as the current timestamp.

Timestamp selection logic 452 may derive selection value 453 from counter/pointer value 250 by applying an offset as discussed above. In the illustrated implementation, the offset is '−2'—i.e., subtracting '2'. In other implementations, other logic may be used to derive selection value 453. However derived, selection value 453 provides a timestamp output 454 from multiplexer 404, having minimal or no jitter.

Whatever timestamp 454 is selected, because of the offset applied to counter/pointer value 250, timestamp 454 may be a number of clock periods out-of-date. Therefore, timestamp 454 is input to timestamp selection logic 452 which, with knowledge of the offset applied, can compensate for that offset, and for any other delays in timestamp synchronization circuitry 400 (including delay caused by register pair 451), to output a corrected time-of-day 455.

Figure 5:
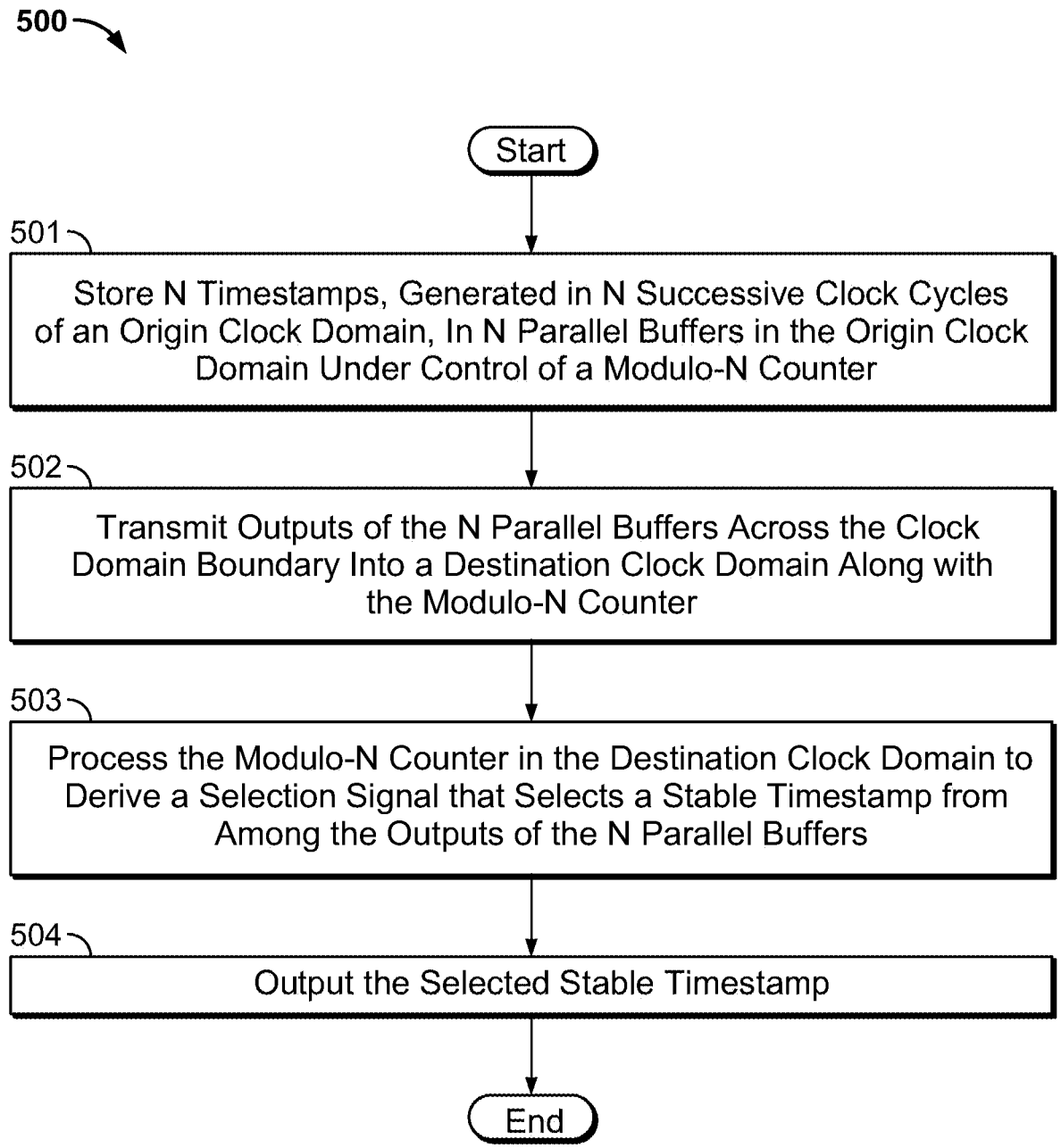
FIG. 5 is a flow diagram illustrating a method in accordance with implementations of the subject matter of this disclosure.

A method 500 according to implementations of the subject matter of this disclosure is diagrammed in FIG. 5. Method 500 begins at 501, where N timestamps, generated in N successive clock cycles of an origin clock domain, are stored in N parallel buffers in the origin clock domain under control of a modulo-N counter. At 502, outputs of the N parallel buffers are transmitted across the clock domain boundary into a destination clock domain along with the modulo-N counter. At 503, the modulo-N counter is processed in the destination clock domain to derive a selection signal that selects a stable timestamp from among the outputs of the N parallel buffers. At 504, the selected stable timestamp is outputted, and method 500 ends.

Thus it is seen that synchronization of timestamp signals across clock domain boundaries, and specifically the transmission of timestamp signals across clock domain boundaries with reduced jitter, or without jitter, has been provided.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. A method of reducing jitter in transmission of a timestamp across a clock domain boundary, the method comprising:

storing N timestamps, generated in N successive clock cycles of an origin clock domain, in N parallel buffers in the origin clock domain under control of a modulo-N counter;

transmitting outputs of the N parallel buffers across the clock domain boundary into a destination clock domain along with the modulo-N counter;

applying an offset to the modulo-N counter in the destination clock domain, that accounts for both uncertainty in the modulo-N counter and instability in the N timestamps, to derive a selection signal that selects a stable timestamp from among the outputs of the N parallel buffers; and outputting the selected stable timestamp.

2. The method of reducing jitter according to claim 1 wherein storing the N timestamps under control of the modulo-N counter comprises storing the N timestamps under control of a Gray-coded modulo-N counter to reduce jitter in the modulo-N counter across the clock domain boundary.

3. The method of reducing jitter according to claim 1 wherein:
N equals 4; and
the offset equals 2.

4. The method of reducing jitter according to claim 1 further comprising processing the selected timestamp to account for temporal shifting caused by the offset.

5. The method of reducing jitter according to claim 1 further comprising processing the selected timestamp to account for additional temporal shifting caused during the selection of the stable timestamp.

6. The method of reducing jitter according to claim 1 wherein transmitting the outputs of the N parallel buffers across the clock domain boundary comprises delaying the outputs of the N parallel buffers.

7. The method of reducing jitter according to claim 6 further comprising processing the selected timestamp to account for temporal shifting caused by the delaying.

8. The method of reducing jitter according to claim 7 further comprising processing the selected timestamp to account for temporal shifting caused by selecting from among the outputs of the N parallel buffers.

9. Timestamp synchronization circuitry for reducing jitter in transmission of a timestamp across a clock domain boundary, the timestamp synchronization circuitry comprising:
N parallel buffers in an origin clock domain, the N parallel buffers being configured to store N timestamps generated in N successive clock cycles in the origin clock domain;
a modulo-N counter configured to generate a selection signal to indicate in which of the N parallel buffers a current timestamp is stored; and
timestamp selection circuitry in a destination clock domain across the clock domain boundary, the timestamp selection circuitry being configured to apply an offset to the modulo-N counter in the destination clock domain, that accounts for both uncertainty in the modulo-N counter and instability in the N timestamps, to derive a selection signal that selects a stable timestamp from among the outputs of the N parallel buffers and to output the selected stable timestamp.

10. The timestamp synchronization circuitry of claim 9 wherein the modulo-N counter is Gray-coded.

11. The timestamp synchronization circuitry of claim 9 wherein:
N equals 4; and
the offset equals 2.

12. The timestamp synchronization circuitry of claim 9 wherein the timestamp selection circuitry is further configured to process the selected timestamp to account for temporal shifting caused by the offset.

13. The timestamp synchronization circuitry of claim 9 wherein the timestamp selection circuitry is further configured to process the selected timestamp to account for additional temporal shifting caused during the selection of the stable timestamp.

14. The timestamp synchronization circuitry of claim 9 further comprising delay circuitry configured to delay the outputs of the N parallel buffers when transmitting the outputs of the N parallel buffers across the clock domain boundary.

15. The timestamp synchronization circuitry of claim 14 wherein the timestamp selection circuitry is further configured to process the selected timestamp to account for temporal shifting caused by the delay circuitry.

16. The timestamp synchronization circuitry of claim 15 wherein the timestamp selection circuitry is further configured to process the selected timestamp to account for temporal shifting caused by selecting from among the outputs of the N parallel buffers.

17. Timestamp synchronization circuitry for reducing jitter in transmission of a timestamp across a clock domain boundary, the timestamp synchronization circuitry comprising:
N parallel buffer means in an origin clock domain, the N parallel buffer means being configured to store N timestamps generated in N successive clock cycles in the origin clock domain;
modulo-N counter means configured to generate a selection signal to indicate in which of the N parallel buffer means a current timestamp is stored; and
timestamp selection means in a destination clock domain across the clock domain boundary, the timestamp selection means being configured to apply an offset to the modulo-N counter means in the destination clock domain, that accounts for both uncertainty in the modulo-N counter means and instability in the N timestamps, to derive a selection signal that selects a stable timestamp from among the outputs of the N parallel buffer means and to output the selected stable timestamp.

18. The timestamp synchronization circuitry of claim 17 wherein the modulo-N counter means is Gray-coded.

19. The timestamp synchronization circuitry of claim 17 wherein:
N equals 4; and
the offset equals 2.

20. The timestamp synchronization circuitry of claim 17 wherein the timestamp selection means is further configured to process the selected timestamp to account for temporal shifting caused by the offset.

21. The timestamp synchronization circuitry of claim 17 wherein the timestamp selection means is further configured to process the selected timestamp to account for additional temporal shifting caused during the selection of the stable timestamp.

22. The timestamp synchronization circuitry of claim 17 further comprising delay means configured to delay the outputs of the N parallel buffer means when transmitting the outputs of the N parallel buffer means across the clock domain boundary.

23. The timestamp synchronization circuitry of claim 22 wherein the timestamp selection means is further configured to process the selected timestamp to account for temporal shifting caused by the delay means.

24. The timestamp synchronization circuitry of claim 23 wherein the timestamp selection means is further configured to process the selected timestamp to account for temporal shifting caused by selecting from among the outputs of the N parallel buffer means.

\* \* \* \* \*